(12) United States Patent
Zhou et al.

(10) Patent No.: US 7,569,112 B2
(45) Date of Patent: Aug. 4, 2009

(54) SCANNING PROBE APPARATUS WITH IN-SITU MEASUREMENT PROBE TIP CLEANING CAPABILITY

(75) Inventors: Lin Zhou, LaGrangeville, NY (US); Dmitriy Shneyder, Hopewell Junction, NY (US)

(73) Assignee: International Business Machines Corporation, Armonk, NY (US)

(*) Notice: Subject to any disclaimer, the term of this patent is extended or adjusted under 35 U.S.C. 154(b) by 318 days.

(21) Appl. No.: 11/687,033

(22) Filed: Mar. 16, 2007

(65) Prior Publication Data
US 2008/0223118 A1    Sep. 18, 2008

(51) Int. Cl.
B08B 11/00 (2006.01)
B08B 6/00 (2006.01)
G12B 21/00 (2006.01)
G01N 13/10 (2006.01)
H01J 99/00 (2006.01)

(52) U.S. Cl. .............................. 134/1; 850/17
(58) Field of Classification Search ............... 73/105; 134/1; 850/8, 17
See application file for complete search history.

(56) References Cited

U.S. PATENT DOCUMENTS 7,495,240 B2* 2/2009 Hopkins et al. ............ 73/105 X

2007/0131249 A1* 6/2007 Nakaue ........................ 134/1 X

FOREIGN PATENT DOCUMENTS

EP          736746 A1 * 10/1996
WO    WO 2006035403 A2 *  4/2006

OTHER PUBLICATIONS

CO2 Snow Jet Cleaning, [online], [retrieved on Dec. 21, 2006]. Retrieved from the Internet<URL: www.polymer-physics/uwaterloo.ca/equipment/CO2snow.htm>, 1 page.
de Souza et al., "Implementation of Recycling Routes for Scanning Probe Microscopy Tips," Microsc. Microanalysis, 8, 2002, pp. 509-517, substantially illegible due to photocopy quality.
Senden et al., Plasma Reactor, [online], [retrieved on Dec. 21, 2006]. Retrieved from the Internet <URL: www.rsphysse.anu.edu.au/~tjsl10/plasma.html>, 4 pages.
Electric Field to Produce Spark in Air—Dielectric Breakdown, The Physics Factbook, Elert ed., [online], [retrieved on Aug. 25, 2006]. Retrieved from the Internet <URL: http://hypertextbook.com/facts/2000/AliceHong.shtml.>, dated 2000, 2 pages, by Alice Hong.

* cited by examiner

*Primary Examiner*—Thomas P Noland
(74) *Attorney, Agent, or Firm*—Scully, Scott, Murphy & Presser, P.C.; Rosa Suazo Yaghmour, Esq.

(57) ABSTRACT

A scanning probe apparatus includes a measurement probe tip and an auxiliary probe tip that is movably positionable with respect to the measurement probe tip. The measurement probe tip and the auxiliary probe tip may be positioned juxtaposed, so that an electrical discharge may be effected between the measurement probe tip and auxiliary probe tip to remove a contaminant from the measurement probe tip. The auxiliary probe tip may be integral with a sample support plate within the scanning probe apparatus.

1 Claim, 3 Drawing Sheets

SCANNING PROBE APPARATUS WITH IN-SITU MEASUREMENT PROBE TIP CLEANING CAPABILITY

BACKGROUND

1. Field of the Invention

The invention relates generally to scanning probe apparatus and methods, such as but not limited to scanning probe microscopy apparatus and methods. More particularly, the invention relates to scanning probe apparatus and methods with enhanced performance.

2. Description of the Related Art

As semiconductor technology has advanced, dimensions of semiconductor structures and semiconductor devices continuously decrease. Such a continuing decrease in dimensions of semiconductor structures and semiconductor devices often provides for enhanced semiconductor device performance and enhanced semiconductor circuit performance.

Correlating with advances in semiconductor devices and semiconductor technology are advances in measurement technology (i.e., measurement apparatus and measurement methods) that may be used to measure semiconductor structures and semiconductor devices. Particular measurement apparatus and measurement methods include: (1) electron based apparatus and methods such as scanning electron microscopy apparatus and methods, and transmission electron microscopy apparatus and methods; as well as (2) physical probe based apparatus and methods such as scanning probe microscopy apparatus and methods. Due to the direct nature of operation, scanning probe microscopy apparatus and methods, of which atomic force microscopy apparatus and methods are representative but not limiting, are desirable.

While scanning probe microscopy apparatus and methods provide particular advantage when inspecting semiconductor structures and semiconductor devices, scanning probe microscopy apparatus and methods are nonetheless not entirely without problems. In particular, due to the presence of a physical measurement probe tip within a scanning probe microscopy apparatus and method (which is inherently absent within an electron based measurement apparatus and method) a measurement probe tip within a scanning probe microscopy apparatus is subject to physical damage and physical contamination which may compromise operation of the scanning probe microscopy apparatus.

Various apparatus and related methods that may be used for conditioning scanning probe microscopy measurement probe tips are known in the pertinent arts. Particular examples of apparatus and related methods are disclosed within: (1) Senden et al., Plasma Reactor, [online], [retrieved on 2006-12-21]. Retrieved from the Internet <URL: www.rsphysse-.anu.edu.au/tjs110/plasma.html> (a plasma apparatus and method for use thereof that is applicable to cleaning a measurement robe tip such as an atomic force microscopy measurement probe tip); (2) $CO_2$ Snow Jet Cleaning, [online], [retrieved on 2006-12-21]. Retrieved from the Internet<URL: www.polymer-physics/uwaterloo.ca/equipment/ CO2snow.htm> (an apparatus and method for use thereof that employs either liquid or gaseous carbon dioxide expanded through an orifice to provide a jet stream thereof for cleaning a particular substrate); and (3) de Souza et al., "Implementation of Recycling Routes for Scanning Probe Microscopy Tips," Microsc. Microanalysis, 8, 2002, pp. 509-17 (particular cleaning protocols for reclaiming scanning probe microscopy measurement probe tips).

Since scanning probe microscopy apparatus and methods are likely to be of continued importance within semiconductor structure measurement and inspection, as well as semiconductor device measurement and inspection, scanning probe microscopy apparatus and methods that provide for reliable and efficient measurement of semiconductor structures and semiconductor devices are likely to be of considerable interest.

SUMMARY OF THE INVENTION

The invention provides a scanning probe apparatus (i.e., particularly a scanning probe microscopy apparatus) and a related method for operating the scanning probe apparatus. The scanning probe apparatus and the related method provide for reliable and efficient measurement of semiconductor structures and semiconductor devices while using the scanning probe microscopy apparatus and the related method.

The scanning probe apparatus realizes the foregoing object by incorporating an auxiliary probe tip in addition to a measurement probe tip within the scanning probe apparatus. The measurement probe tip and the auxiliary probe tip are electrically connected. The related method for operating the scanning probe apparatus provides for effecting an electrical discharge between the measurement probe tip that is electrically connected with the auxiliary probe tip so as to remove a contaminant material from the measurement probe tip.

A scanning probe apparatus in accordance with the invention includes a measurement probe tip supported by a support member. The scanning probe apparatus also includes an auxiliary probe tip positionable with respect to the measurement probe tip by movement of at least one of the measurement probe tip and the auxiliary probe tip.

Another scanning probe apparatus in accordance with the invention includes a measurement probe tip integral with and supported by a support member. This other scanning probe apparatus also includes an auxiliary probe tip supported by a sample support plate, where at least one of the measurement probe tip and the auxiliary probe tip is positionable with respect to the other of the measurement probe tip and the auxiliary probe tip.

A method for cleaning a scanning probe apparatus probe tip in accordance with the invention includes positioning one of an auxiliary probe tip and a measurement probe tip in a vicinity of the other of the auxiliary probe tip and the measurement probe tip in-situ within a scanning probe apparatus. This particular method also includes generating an electrical discharge between the auxiliary probe tip and the measurement probe tip.

BRIEF DESCRIPTION OF THE DRAWINGS

The objects, features and advantages of the invention are understood within the context of the Description of the Preferred Embodiment, as set forth below. The Description of the Preferred Embodiment is understood within the context of the accompanying drawings, that form a material part of this disclosure, wherein.

DESCRIPTION OF THE PREFERRED EMBODIMENT

The invention, which includes a scanning probe apparatus and a related method for operating the scanning probe apparatus, is understood within the context of the description provided below. The description provided below is understood within the context of the drawings described above. Since the drawings are intended for illustrative purposes, the drawings are not necessarily drawn to scale.

Figure 1:
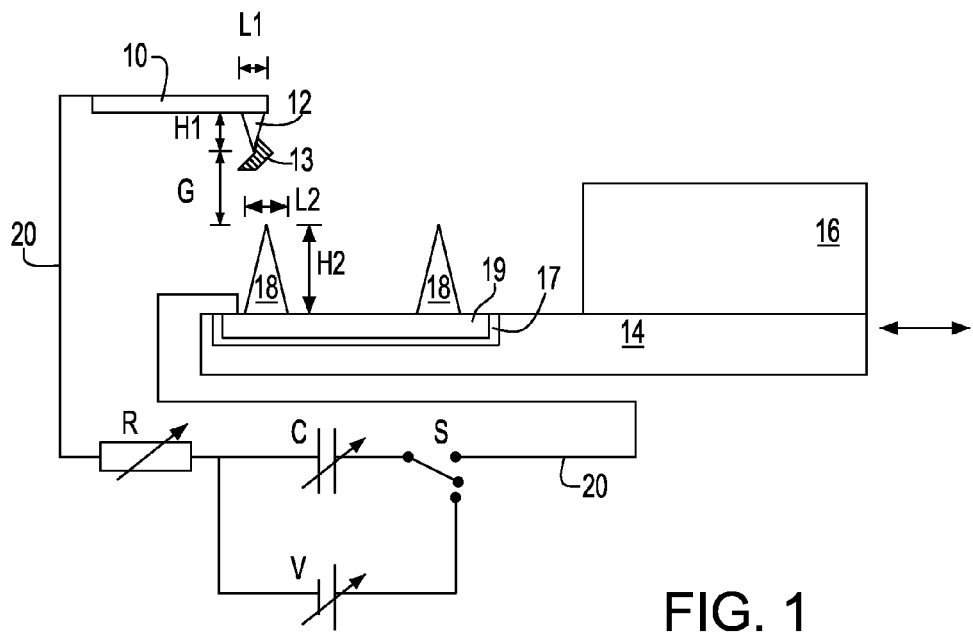
FIG. 1 shows a schematic diagram illustrating a scanning probe microscopy apparatus comprising an embodiment of an apparatus in accordance with the invention, the scanning probe microscopy apparatus having a contaminant material located upon a measurement probe tip thereof.

FIG. 1 shows a schematic diagram illustrating a scanning probe microscopy apparatus comprising an embodiment of an apparatus in accordance with the invention. This particular scanning probe microscopy apparatus has a contaminant material located upon a measurement probe tip thereof.

Although the preferred embodiment illustrates the invention within the context most particularly of a scanning probe microscopy apparatus that is intended to represent an atomic force microscopy apparatus, the invention is not intended to be so limited. Rather, the invention is also intended to be applicable to scanning probe microscopy apparatus (and related methods for operation thereof) including but not limited to atomic force microscopy apparatus and methods, scanning capacitance microscopy apparatus and methods, scanning spreading resistance microscopy apparatus and methods and scanning tunneling microscopy apparatus and methods. Also intended to be contemplated within the context of the invention are scanning probe apparatus that are not necessarily scanning probe microscopy apparatus. Included within this group are scanning probe apparatus such as but not limited to a profilometer apparatus.

FIG. 1 shows a support member 10 having a measurement probe tip 12 located affixed thereto. FIG. 1 also shows a sample carrier plate 14 translationally movable and juxtaposed the support member 10. Although FIG. 1 illustrates the sample carrier plate 14 as movable with respect to the support member 10, the support member 10 may in fact be movable with respect to the sample carrier plate 14. Thus, at least one of the support member 10 and the sample carrier plate 14 is movable with respect to the other of the support member 10 and the sample carrier plate 14. A sample 16 is located upon the sample carrier plate 14. A dielectric layer 17 is located upon a portion of the sample carrier plate 14, and a contact plate 19 is located upon the dielectric layer 17 and electrically isolated from the sample carrier plate 14 by the dielectric layer 17. A plurality of auxiliary probe tips 18 (of which one is pointed juxtaposed the measurement probe tip 12 due to a relative movement of the support member 10 and the sample carrier plate 14) is also located affixed to the contact plate 19 (i.e., and thus ultimately supported by the sample carrier plate 14). Finally, FIG. 1 illustrates an electrical connection 20 between the support member 10 and the contact plate 19. Interposed within the electrical connection 20 is a resistor R, a capacitor C, a voltage (or alternatively power) source V (each of the foregoing of which is variable) and a switch S.

The support member 10 may comprise any of several materials having appropriate mechanical characteristics that provide for adequate support of the measurement probe tip 12 affixed thereto. In general, such materials may be selected from the group including but not limited to conductor materials, semiconductor materials and dielectric materials that have appropriate mechanical characteristics to fulfill the foregoing requirements. However, within the context of the instant embodiment, the support member 10 comprises at least in part a conductor material that also provides adequate electrical continuity between the electrical connection 20 and the measurement probe tip 12.

The measurement probe tip 12 typically has a linewidth L1 from about 0.5 to about 20 microns projected upon the support member 10, and a height H1 from about 0.5 to about 20 microns extending below the support member 10. Similarly with the support member 10, the measurement probe tip 12 may, under certain general circumstances, comprise any of a conductor material, a semiconductor material or a dielectric material. However, within the context of the instant embodiment, and for reasons that will become more apparent within the context of additional disclosure below, the measurement probe tip 12 also comprises at least in part a conductor material that provides for electrical continuity through the support member 10, and to the electrical connection 20.

In accordance with the foregoing disclosure, the support member 10 and the measurement probe tip 12 may comprise at least in part any of several conductor materials. Non-limiting examples include certain metals, metal alloys and metal nitrides. Also included as non-limiting examples are doped silicon materials (i.e., having a dopant content from about 1e18 to about 1e22 dopant atoms per cubic centimeter), related carbon materials (including carbon nanotube materials), diamond materials and silicon carbide materials.

The support member 10 and the measurement probe tip 12 may be fabricated and assembled as separate components that comprise either the same or separate conductor materials. Alternatively, the measurement probe tip 12 may be integrally fabricated within the support member 10 while using an appropriate method. Particular appropriate methods may include masking methods that allow for dimensionally specific etching that yields the characteristic pointed tip to the measurement probe tip 12 within an integral support member 10. Other particular methods are not excluded.

The contaminant material 13 may comprise at least one of a particulate contaminant material and a film contaminant material, although the contaminant material 13 that is illustrated more particularly within FIG. 1 is intended as a particulate contaminant material. The contaminant material 13 may become attached to the measurement probe tip 12 as a result of contact of the measurement probe tip 12 with the sample 16 when the scanning probe microscopy apparatus whose schematic cross-sectional diagram is illustrated in FIG. 1 provides for such contact between the measurement probe tip 12 and the sample 16. Under such circumstances, the contaminant material 13 will often comprise materials derived from the sample 16. Alternatively, and in particular when the measurement probe tip 12 is not intended for direct contact with the sample 16, the measurement probe tip 12 may accumulate thereupon an organic film contaminant material or an alternative film contaminant material by virtue of adventitious environmental exposure thereto and sorption thereof. Thus, as a general consideration within the context of the instant embodiment, a measurement probe tip (such as the measurement probe tip 12) that is intended for direct contact with a sample is more likely to have a particulate contaminant material located thereupon and attached thereto, while a measurement probe tip that is not intended for direct contact with a sample is more likely to have a film contaminant material located thereupon and attached thereto.

The sample carrier plate 14 may comprise any of a conductor material, semiconductor material and dielectric material, but in general is intended at least in part as comprising a conductor material. Typically, the sample carrier plate 14 comprises a conductor metal, such as but not limited to an aluminum, copper, stainless steel or alternative conductor metal, sized in aerial dimensions appropriate to accommodate the sample 16, and having a thickness from about 10 to about 40 millimeters. Typically, the sample carrier plate 14 is grounded, but neither the instant embodiment nor the invention is so limited.

The dielectric layer 17 may comprise any of several dielectric materials that adequately electrically isolate the sample carrier plate 14 and the contact plate 19 (i.e. having the auxiliary probe tips 18 located thereupon). Oxide dielectric materials and nitride dielectric materials that may provide ceramic dielectric materials are included as non-limiting examples of dielectric materials from which may be comprised the dielectric layer 17. Typically, the dielectric layer 17 has a thickness from about 0.1 to about 5 millimeters.

The contact plate 19 may in general comprise a conductor material analogous to a conductor material from which may be comprised the sample carrier plate 14. Particularly, the contact plate 19 is intended to provide adequate electrical continuity between the measurement probe tip 12 and a particular auxiliary probe tip 18 through the electrical connection 20, and further through the support member 10.

The auxiliary probe tips 18 also comprise at least in part a conductor material in order to provide electrical continuity between the measurement probe tip 12 and the auxiliary probe tips 18. Similarly with the support member 10 and the measurement probe tip 12, the auxiliary probe tips 18 may be integral with the contact plate 19, or alternatively the auxiliary probe tips 18 may be assembled as separate components onto the contact plate 19. The auxiliary probe tips 18 typically comprise the same conductor material or an analogous conductor material as the sample carrier plate 14 and the contact plate 19, although such is not a limitation of the embodiment or the invention. Such conductor materials may be analogous, equivalent or identical to the conductor materials that are used for fabricating the support member 10 and the measurement probe tip 12. Typically, the auxiliary probe tips 18 have a linewidth L2 from about 0.5 to about 500 microns projected upon the sample carrier plate 14 and a height H2 from about 0.5 to about 500 microns upon the sample carrier plate 14. Typically, the auxiliary probe tips 18 may be separated from the measurement probe tip 12 by a vertical separation gap G having a distance from about 0.01 to about 10 microns. Typically, the measurement probe tip 12 and the auxiliary probe tip 18 are juxtaposed.

The sample 16, which is not intended as a component within the scanning probe microscopy apparatus in accordance with the instant embodiment, may comprise a sample of any construction and composition appropriate to measurement while using a scanning probe microscopy apparatus in general, and more particularly a scanning probe microscopy apparatus in accordance with the embodiment and the invention. Such a sample 16 may comprise materials including but not limited to conductor materials, semiconductor materials and dielectric materials. Such a sample 16 may also be intended to be measured or inspected with respect to topographic characteristics, or alternatively aerial electrical properties, such as but not limited to resistance, capacitance and quantum mechanical tunneling properties. Typically but not exclusively, the sample 16 comprises a semiconductor material that may also comprise a semiconductor substrate.

The electrical connection 20 typically comprises a hard wired electrical connection that is otherwise generally conventional in the semiconductor measurement apparatus construction art. Such a hard wired electrical connection is typically effected using appropriately sized conductor materials that in turn may be free standing or alternatively supported within an appropriate dielectric substrate.

The resistor R, the capacitor C and the voltage source V are all sized appropriately to effectuate operation of the scanning probe microscopy apparatus in accordance with the instant embodiment. Particular electrical operational conditions are discussed in greater detail below. Typically, the resistor R will have a variable resistance in a range from about 1 to about 1000 ohms. Typically, the capacitor C will have a variable capacitance in a range from about 1 to about 500 microfarads and a voltage rating from about 0 to about 30 volts. Typically, the voltage source V will have a variable voltage in a range from about 0 to about 30 volts and amperage in a range from about 0 to about 10 amperes.

The switch S may comprise a mechanical switch, an electromechanical switch or a purely electronic switch. Electronic switches are generally preferred insofar as purely electronic switches may allow for a rapid cycling between various switch positions within a particular switch S. As is illustrated within the schematic diagram of FIG. 1, the switch S is in an open position, and connected with neither the electrical connection 20 that is further connected to the contact plate 19, nor the voltage source V.

Figure 2:
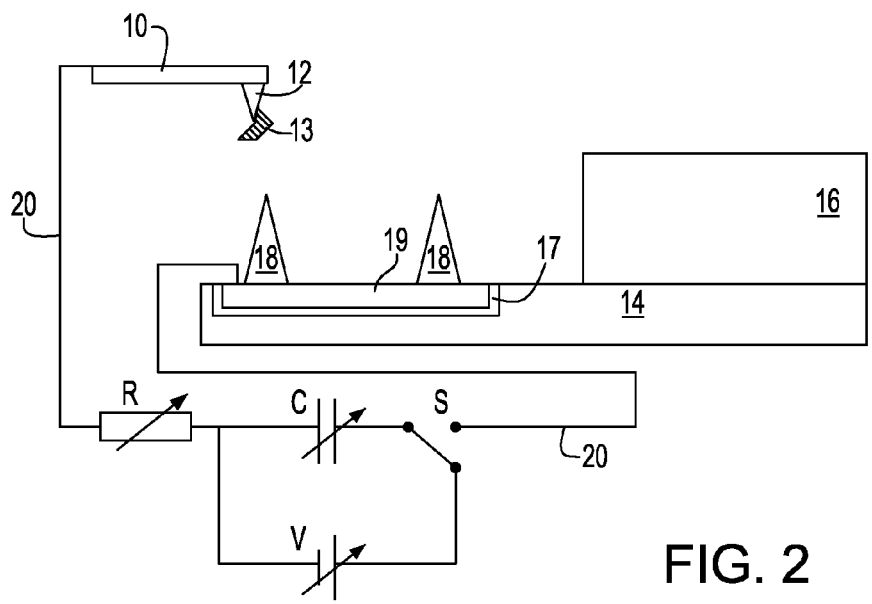
FIG. 2 to FIG. 4 show a series of schematic diagrams illustrating the results of progressive stages in operation of the scanning probe microscopy apparatus of FIG. 1 to remove the contaminant material from the measurement probe tip thereof in accordance with a method of the invention.
Figure 3:
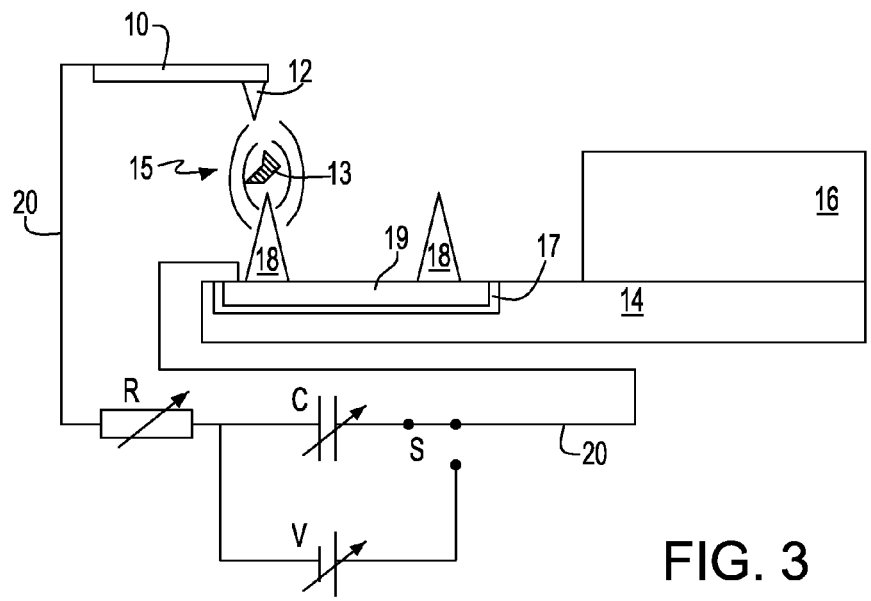
Figure 4:
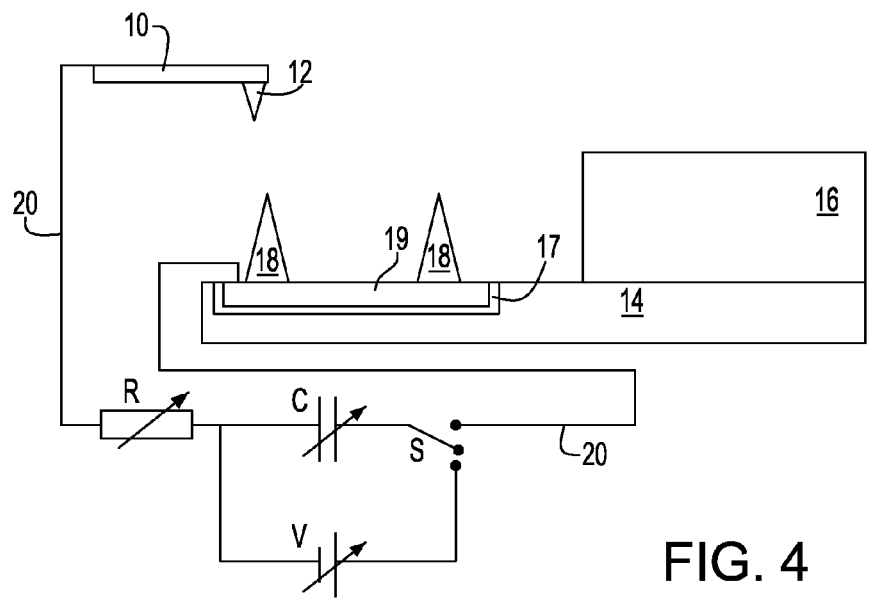

FIG. 2 to FIG. 4 show the results of progressive stages of operating the scanning probe microscopy apparatus whose schematic diagram is illustrated in FIG. 1, in accordance with a method of the instant embodiment and the invention.

FIG. 2 first shows the results of closing the switch S to allow for charging of the capacitor C. The capacitor C is typically charged to provide a plate voltage that allows for dielectric breakdown of a material (i.e., typically air) located interposed between the measurement probe tip 12 and a particular counter-opposed auxiliary probe tip 18 when the switch S is subsequently closed and the plate voltage of the capacitor C is discharged to the measurement probe tip 12 and the particular counter-opposed auxiliary probe tip 18.

FIG. 3 shows the results of closing the switch S, after the capacitor C has been adequately charged, to provide contact with the electrical connection 20 that is connected with the sample carrier plate 14. As a result of closing the switch S, an electrical discharge 15 is effected interposed between the measurement probe tip 12 and a particular closely juxtaposed auxiliary probe tip 18. As is illustrated within the schematic diagram of FIG. 3, the electrical discharge 15 causes for dislodgment and removal of the contaminant 13 from the measurement probe tip 12, particularly when the contaminant 13 is a particulate contaminant material. In an alternative, when the contaminant 13 is a film contaminant material, the electrical discharge 15 may also cause for removal of the film contaminant material by evaporation, oxidation or other electrically induced physical or chemical processes.

FIG. 4 shows the results of reopening the switch S and severing the connection through the electrical connection 20 to the sample carrier plate 14. As is illustrated within the schematic diagram of FIG. 4, the scanning probe microscopy apparatus that is illustrated in FIG. 4 is then ready for additional operation for measurement of the sample 16, while using the measurement probe tip 12 that no longer has attached thereto the contaminant 13.

While not limiting the embodiment or the invention, as background for a functional electrical analysis of operation of a scanning probe microscopy apparatus in accordance with the embodiment and the invention, one first assumes (as noted above) that upon closing of the switch S that is illustrated in FIG. 3, a voltage across the measurement probe tip 12 and the auxiliary probe tip 18 is equal to a plate voltage across the capacitor C plates. As further background for a functional electrical analysis of operation of a scanning probe microscopy apparatus in accordance with the embodiment of the invention, an electrical field of about 3e6 V/m is typically needed to ionize ambient air and to induce therein an electrical discharge such as a glow discharge. See, e.g., Electric Field to Produce Spark in Air—Dielectric Breakdown, The Physics Factbook, Elert ed., [online], [retrieved on 2006-08-25]. Retrieved from the Internet <URL:http://hypertextbook.com/facts/2000/AliceHong.shtml.>

In particular, an electric field E in an air gap between a measurement probe tip 12 and an auxiliary probe tip 18 within a scanning probe microscopy apparatus in accordance with the embodiment is defined as $E=U/G$, where U equals a capacitor C plate voltage and G equals the measurement probe tip 12 to auxiliary probe tip separation gap distance. As noted above, such a gap G is typically in a range from about a few nanometers to about a few microns. When a particular capacitor C plate voltage U is adequate to effect dielectric breakdown (i.e., induce a glow discharge), the capacitor C plate voltage U may alternatively be defined as a breakdown voltage.

Figure 5:
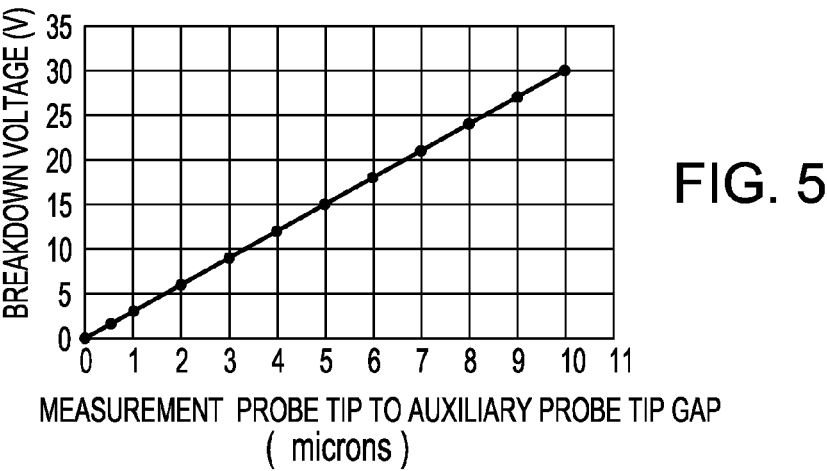
FIG. 5 shows a plot of Breakdown Voltage versus Measurement Probe Tip to Auxiliary Probe Tip Gap for a scanning probe microscopy apparatus and a related method in accordance with an embodiment of the invention.

FIG. 5 shows a relationship between a breakdown voltage and a measurement probe tip 12 to auxiliary probe tip 18 separation gap G when the separation gap G comprises normal ambient air. In particular, as a separation gap G distance is reduced, a breakdown voltage is also reduced, typically linearly.

In order to effect a variation in a breakdown voltage, particular characteristics of a material interposed between a measurement probe tip 12 and an auxiliary probe tip 18 may be modified. For example, increased humidity of an ambient air within a separation gap G would typically reduce a breakdown voltage. Alternatively, a reduced pressure of a gaseous material (or increased gaseous ion content of the gaseous material) interposed within the separation gap G would also be expected to reduce a breakdown voltage.

Figure 6:
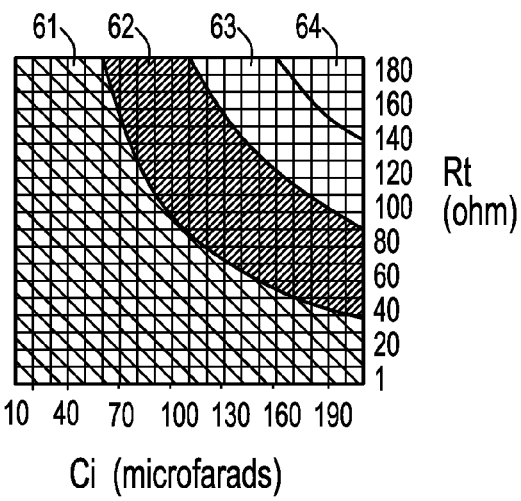
FIG. 6 shows a plot of Capacitance versus Resistance illustrating capacitance/resistance time constant bands that may be considered when operating a scanning probe microscopy apparatus in accordance with the invention, while using the related method in accordance with the invention.

A particular discharge current I for operation of a scanning probe microscopy apparatus in accordance with the embodiment and the invention is determined as $I=U/Rt*\exp(-t/(Rt*Ci))$. Ci is a particular capacitance. Rt is a total resistance of a discharge path within a scanning probe microscopy apparatus in accordance with the embodiment. Such a total resistance includes, but is not limited to: (1) a resistance of the measurement probe tip 12; (2) a resistance of the support member 10; (3) a resistance of the electrical connection 20; (4) a resistance of the resistor R, (5) a resistance of the contact plate 19; (6) a resistance of a particular auxiliary probe tip 18; and (7) a resistance of a gap G interposed between a measurement probe tip 12 and an auxiliary probe tip 18. In addition, t is time. FIG. 6 in particular shows a series of contour plots of an Rt*Ci time constant from the above equation for discharge current. Bands that correspond with reference numerals 61, 62, 63 and 64 correspond with time constants of 0-10, 10-20, 20-30 & 30-40 milliseconds.

Figure 7:
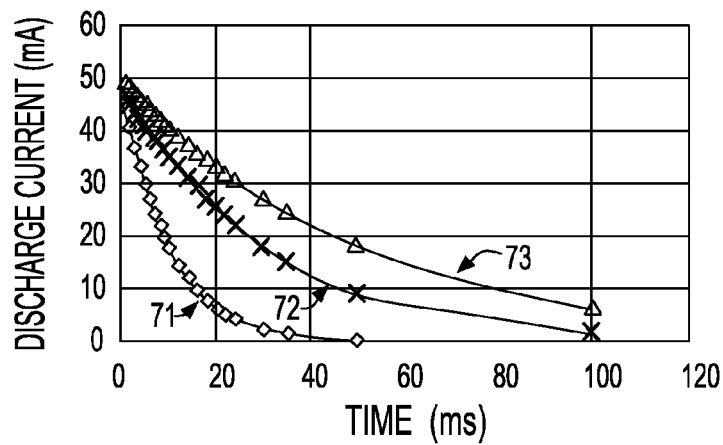
FIG. 7 shows a plot of Discharge Current versus Time that may be considered when operating a scanning probe microscopy apparatus in accordance with the invention, while using the related method in accordance with the invention.

FIG. 7 in particular illustrates a series of plots of Discharge Current versus Time that correspond with various capacitances. In particular, reference numerals 71, 72 and 73 correspond with capacitance of 100, 300 and 500 microfarads capacitance for Ci. As is illustrated within the schematic cross-sectional diagram of FIG. 7, particular higher capacitances Ci provide a greater discharge time I.

As a summary of the above description, operation of a scanning probe microscopy apparatus in accordance with the embodiment, and further in accordance with the method of the embodiment, may first employ a determination and selection of a measurement probe tip 12 to auxiliary probe tip 18 separation gap G distance. On the basis of such a separation gap G distance, a particular capacitor plate voltage U is determined so as to assure dielectric breakdown from a measurement probe tip 12 to a counter-opposed auxiliary probe tip 18. Such a particular capacitor plate voltage U is provided by the voltage source V. Finally, appropriate current and charge decay characteristics may be adjusted within the context of a resistance of the variable resistor R and a capacitance of the variable capacitor C.

In accordance with the above description, the instant embodiment provides a scanning probe microscopy apparatus, and a method for operation thereof, that provides for enhanced reliability and efficiency. Within the context of FIG. 3, the scanning probe microscopy apparatus and method for operation thereof realize the foregoing objects by using an auxiliary probe tip 18 juxtaposed a measurement probe tip 12 so that an electrical discharge may be effected in-situ within the scanning probe microscopy apparatus to remove a contaminant 13 material from the measurement probe tip 12.

The preferred embodiment is illustrative of the invention rather than limiting of the invention. Revisions and modifications may be made to components, dimensions and electrical parameters with respect to a scanning probe microscopy apparatus in accordance with the preferred embodiment, while still providing a scanning probe microscopy apparatus and method for operation thereof in accordance with the invention, further in accordance with the accompanying claims.

What is claimed is:

1. A method for cleaning a scanning probe apparatus probe tip comprising:

positioning one of an auxiliary probe tip and a measurement probe tip in a vicinity of the other of the auxiliary probe tip and the measurement probe tip in-situ within a scanning probe apparatus, wherein positioning of one of the auxiliary probe tip and the measurement probe tip uses:

a measurement probe tip that is integral with a support member within the scanning probe apparatus, and an auxiliary probe tip that is integral with a sample carrier plate within the scanning probe apparatus, and after positioning said auxiliary probe tip is located opposite and at a distance from about 0.01 to about 10 microns with respect to the measurement probe tip; and generating an electrical discharge between the auxiliary probe tip and the measurement probe tip, wherein the generating the electrical discharge removes a particulate contaminant material from the measurement probe tip.

\* \* \* \* \*